United States Patent
Leong

(10) Patent No.: US 11,841,894 B2
(45) Date of Patent: *Dec. 12, 2023

(54) DATA STRUCTURE QUERIES TO MANAGE LOADING TIME IN MULTIMEDIA CONTENT

(71) Applicant: GOOGLE LLC, Mountain View, CA (US)

(72) Inventor: Jian Wei Leong, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/882,920

(22) Filed: Aug. 8, 2022

(65) Prior Publication Data

US 2022/0391431 A1 Dec. 8, 2022

Related U.S. Application Data

(63) Continuation of application No. 16/463,763, filed as application No. PCT/US2017/054940 on Oct. 3, 2017, now Pat. No. 11,409,783.

(51) Int. Cl.
*G06F 16/438* (2019.01)
*G06F 16/432* (2019.01)
(Continued)

(52) U.S. Cl.
CPC .......... *G06F 16/433* (2019.01); *G06F 16/435* (2019.01); *G06F 16/438* (2019.01);
(Continued)

(58) Field of Classification Search
CPC .............................. G06F 16/433; G06F 16/438
(Continued)

(56) References Cited

U.S. PATENT DOCUMENTS

| 5,559,940 A | 9/1996 | Hutson |
| 8,712,944 B1 | 4/2014 | Kim |

(Continued)

FOREIGN PATENT DOCUMENTS

| CN | 101488346 | 7/2009 |
| CN | 103425727 | 12/2013 |

(Continued)

OTHER PUBLICATIONS

European Patent Office; Preliminary Opinion issued in Application No. 17787726.3, 9 pages, dated Aug. 25, 2022.

(Continued)

*Primary Examiner* — Kimberly L Wilson
(74) *Attorney, Agent, or Firm* — Gray Ice Higdon

(57) ABSTRACT

Systems and methods data structures queries to manage loading time of multimedia content are provided. A system receives an input audio signal from a computing device and identifies a request. The system identifies a quantized day value and a quantized time value. The system retrieves, via a lookup in a multi-dimensional matrix data structure with the quantized day value and quantized time value, signals for the quantized day value and the quantized time value. The system generates a query with the signals, and applies the query to a multimedia content data structure to identify a plurality of multimedia content items that match the plurality of signals. The system provides an indication of the plurality of multimedia content items that match the signals for the quantized day value and the quantized time value retrieved from the multi-dimensional matrix data structure.

20 Claims, 4 Drawing Sheets

(51) Int. Cl.
  *G10L 15/18* (2013.01)
  *G10L 15/22* (2006.01)
  *G06F 16/435* (2019.01)
  *G06F 16/48* (2019.01)
  *G06N 20/00* (2019.01)
  *G10L 15/08* (2006.01)

(52) U.S. Cl.
  CPC .......... *G06F 16/48* (2019.01); *G10L 15/1822* (2013.01); *G10L 15/22* (2013.01); *G06N 20/00* (2019.01); *G10L 15/1815* (2013.01); *G10L 2015/088* (2013.01); *G10L 2015/223* (2013.01)

(58) Field of Classification Search
  USPC ........................................................ 707/722
  See application file for complete search history.

(56) References Cited

U.S. PATENT DOCUMENTS

| | | | |
|---|---|---|---|
| 9,253,282 | B2* | 2/2016 | O'Donoghue ..... G06Q 30/0254 |
| 9,262,446 | B1 | 2/2016 | Katragadda |
| 9,338,493 | B2 | 5/2016 | Van Os et al. |
| 9,524,487 | B1 | 12/2016 | Yagnik et al. |
| 10,572,476 | B2 | 2/2020 | Skinder |
| 2009/0157702 | A1 | 6/2009 | Harris |
| 2010/0287588 | A1 | 11/2010 | Cox et al. |
| 2013/0046831 | A1* | 2/2013 | Schultz ................ G06F 16/972 709/204 |
| 2014/0019443 | A1 | 1/2014 | Golshan |
| 2014/0280292 | A1 | 9/2014 | Skinder |
| 2017/0068643 | A1 | 3/2017 | Shamir et al. |
| 2017/0208134 | A1 | 7/2017 | Grauch |
| 2019/0278795 | A1 | 9/2019 | Leong |
| 2019/0340564 | A1 | 11/2019 | Holmquist et al. |

FOREIGN PATENT DOCUMENTS

| | | |
|---|---|---|
| CN | 104584010 | 4/2015 |
| WO | 2019070244 | 11/2019 |

OTHER PUBLICATIONS

European Patent Office; Summons to Attend Oral Proceedings issued in Application No. 17787726.3, 9 pages, dated Jan. 28, 2022.
Zhao Shenglin et al.; Aggregated Temporal Tensor Factorization Model for Point-of-Interest Recommendation, Advances in Biometrics: International Conference, Aug. 27-29, 2007, pp. 450-458, dated Apr. 29, 2016.
European Patent Office; Communication Pursuant Article 94(3) EPC issue in Application No. 17787726.3; 8 pages; dated Dec. 15, 2020.
International Search Report and Written Opinion of PCT Ser. No. PCT/US2017/054940 dated Jan. 16, 2018.
Anonymous, "Complete Rule Bases", Retrieved from the Internet: URL:http://zone.ni.com/reference/en-XX/help/371361M-01/lvpidmain/complete_rulebase/ [retrieved on Jan. 4, 2018], 1 page dated Jun. 2015.
Keller et al., "How to Use Siri with Apple Music", Retrieved from the Internet: URL:https://www.imore.com/siri-commands-apple-music [retrieved on Jan. 4, 2018]. 19 pages dated Mar. 2017.
China National Intellectual Property Administration; Notification of First Office Action issued in Application No. 201780092060.2; 32 pages; dated Feb. 22, 2023.
Chan, C.; How to use Siri with Apple Music; 10 pages; https://www.imore.com/siricommands-apple-music; dated Mar. 27, 2017.
China National Intellectual Property Administration; Grant Notice issued in Application No. 201780092060.2; 4 pages; dated Sep. 11, 2023.

* cited by examiner

DATA STRUCTURE QUERIES TO MANAGE LOADING TIME IN MULTIMEDIA CONTENT

BACKGROUND

A computing device with limited interfaces can pose challenges to filtering large data sets, which can cause delays in loading time of multimedia content items or portions thereof or result in excessive memory usage.

SUMMARY

The present disclosure is generally directed to managing the response time and effectiveness of data structure queries, as well as loading time of multimedia content items identified via the data structure queries. Systems and methods of the present disclosure are directed to constructing a query using a first data structure storing a multi-dimensional matrix populated with signals, and then applying the query to a second data structure to filter the data set to identify multimedia content items that are responsive to a request. The system can utilize a multi-dimensional matrix data structure that includes values for signals that can be used to generate a query. The multi-dimensional matrix data structure can be a two-by-two matrix for each of the signals, where a first dimension corresponds to days and a second dimension corresponds to times. The first and second dimensions can be quantized, thereby providing a multi-dimensional matrix data structure with a reduced number of rows and columns as compared to values that are not quantized. By producing a smaller matrix structure, the data processing system can respond to queries of the first data structure with reduced delay and latency. The data processing system can generate a second query using values of the signals from the matrix structure, and then apply the second query to a second data structure storing multimedia content items. Thus, by using a reduced matrix data structure to generate a query, the data processing system can reduce latency and delay in loading multimedia content items responsive to a request.

At least one aspect is directed to a system for data structure queries to manage loading time of multimedia content. The system can include a data processing system comprising a digital assistant component executed by one or more processors. The digital assistant component can provide audio input and output to and from a user in a conversational manner and can include or interface with a natural language processor component and a query generator component. The data processing system can receive, via an interface of the data processing system, data packets comprising an input audio signal detected by a sensor of a computing device. The data processing system can parse the input audio signal to identify a request. The data processing system can identify, responsive to the request, a quantized day value and a quantized time value corresponding to the request. The data processing system can retrieve, via a lookup in a multi-dimensional matrix data structure with the quantized day value and quantized time value, one or more values for each of a plurality of signals for the quantized day value and the quantized time value. A first dimension of the multi-dimensional matrix data structure can have quantized days and a second dimension of the multi-dimensional matrix data structure having quantized times. The data processing system can generate a query with the one or more values for each of the plurality of signals retrieved from the multi-dimensional matrix structure with the quantized day value and the quantized time value. The data processing system can apply the query to a multimedia content data structure to identify, in response to the query, a plurality of multimedia content items that match the one or more values for each of the plurality of signals. The data processing system can provide, to the computing device, for presentation via a graphical user interface rendered by the computing device, an indication of the plurality of multimedia content items that match the one or more values for each of the plurality of signals for the quantized day value and the quantized time value retrieved from the multi-dimensional matrix data structure.

At least one aspect is directed to a method of querying data structures to manage loading time of multimedia content. The method can include a data processing system receiving, via an interface, data packets comprising an input audio signal detected by a sensor of a computing device. The method can include the data processing system parsing the input audio signal to identify a request. The method can include the data processing system identifying, responsive to the request, a quantized day value and a quantized time value corresponding to the request. The method can include the data processing system retrieving, via a lookup in a multi-dimensional matrix data structure with the quantized day value and quantized time value, one or more values for each of a plurality of signals for the quantized day value and the quantized time value. A first dimension of the multi-dimensional matrix data structure can have quantized days and a second dimension of the multi-dimensional matrix data structure can have quantized times. The method can include the data processing system generating a query with the one or more values for each of the plurality of signals retrieved from the multi-dimensional matrix structure with the quantized day value and the quantized time value. The method can include the data processing system applying the query to a multimedia content data structure to identify, in response to the query, a plurality of multimedia content items that match the one or more values for each of the plurality of signals. The method can include the data processing system providing, to the computing device, for presentation via a graphical user interface rendered by the computing device, an indication of the plurality of multimedia content items that match the one or more values for each of the plurality of signals for the quantized day value and the quantized time value retrieved from the multi-dimensional matrix data structure.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
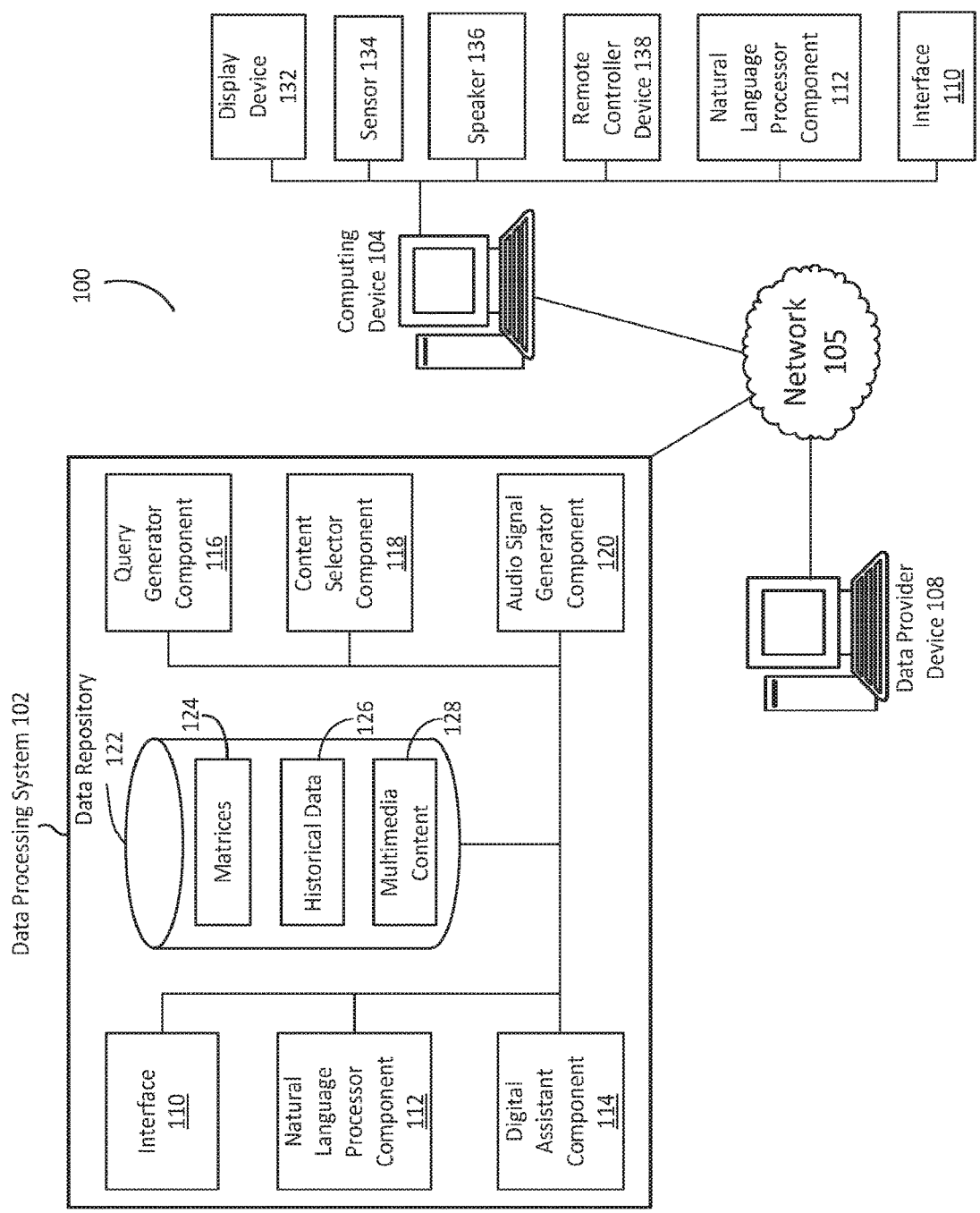
FIG. 1 is an illustration of a system for data structure queries to manage loading time of multimedia content.

Following below are more detailed descriptions of various concepts related to, and implementations of, methods, apparatuses, and systems of routing packetized actions via a computer network. The various concepts introduced above and discussed in greater detail below may be implemented in any of numerous ways.

The present disclosure is generally directed to managing the response time and effectiveness of data structure queries, as well as loading time of multimedia content items identified via the data structure queries. Systems and methods of the present disclosure are directed to constructing a query using a first data structure storing a multi-dimensional matrix populated with signals, and then applying the query to a second data structure to filter the data set to identify multimedia content items that are responsive to a request. The system can utilize a multi-dimensional matrix data structure that includes values for signals that can be used to generate a query. The multi-dimensional matrix data structure can be a two-by-two matrix for each of the signals, where a first dimension corresponds to days and a second dimension corresponds to times. The first and second dimensions can be quantized, thereby providing a multi-dimensional matrix data structure with a reduced number of rows and columns as compared to values that are not quantized. By producing a smaller matrix structure, the data processing system can respond to queries of the first data structure with reduced delay and latency. The data processing system can generate a second query using values of the signals from the matrix structure, and then apply the second query to a second data structure storing multimedia content items. Thus, by using a reduced matrix data structure to generate a query, the data processing system can reduce latency and delay in loading multimedia content items responsive to a request.

The present solution can utilize a double data structure query technique to identify multimedia content items in a manner that reduces resource consumption, processor utilization, bandwidth utilization, size of the data file, or amount of time consumed by a graphics engine by minimizing the number of multimedia content items that are identified responsive to a request. For example, a request for multimedia content received from a user device may lack keywords or search terms. The request may not include parameters to be used for constructing a query to perform a search. For example, the request may include voice input such as "What is there to watch?" In this example, the request lacks additional keywords or terms to generate a query. Thus, the data processing system may provide a large number (e.g., 50, 60, 75, 90, 100, 150 or more) of candidate multimedia content items. However, in a voice-interaction mode in a far-field manner without access to a remote control (e.g., a wireless controller device) it may be challenging to navigate or interact with a large number of search results. Further, it may be resource intensive to provide the large number of multimedia content items for rendering by a graphical user interface provided by the computing device, and there may be increased latency or delay due to identifying the large number of multimedia content items and providing them to the computing device for presentation.

The present solution can facilitate interacting with a computing device having limited interfaces, such as a computing device that is out of reach or does not have touch input, where the primary interactions are voice-based. To do so, the present solution can provide new techniques constructing a query applied to a multimedia data structure to identify minimal candidate multimedia content items to be provided in a graphical user interface for display on a display device. For example, the data processing system can receive a current time stamp and day stamp, map these values to a quantized value, and perform a lookup in a multi-dimensional matrix to retrieve signals corresponding to the quantized values.

For example, the computing device can receive an acoustic signal carrying a request. The acoustic signal can correspond to speech from a user. The request can include "What is there to watch?" Even though the request may not include additional search terms or keywords, the data processing system can provide relevant, minimal recommendations for multimedia content items. The system can provide hyper temporal results. Rather than provide 100 responses, the system can provide only 5 responses, for example, that may be a subset of the 100, partially overlap with the 100, or be different from the 100 responses. To do so, the system utilizes two types of signals: preferences signals and a context signals. The preferences signals can include: 1) a preference for one or more applications to provide the multimedia content items (e.g., preferred provider of multimedia content or source of multimedia content); 2) a preference for a transaction type (e.g., free content, content for purchase, subscription service); 3) a preference for a media consumption mode (e.g., new multimedia content items not previously rendered by the computing device; continue series, re-watch multimedia content items; background mode). The context signals can include: 1) a preference for a media consumption duration (e.g., 15 minutes; 30 minutes; 1 hour; or 90 minutes); and 2) a preference for a media type (e.g., movie, television show, live television, or previously recorded content). The system can populate these values in a 2×2 matrix: Weekend/Weekday by Day/Night. The system can determine metrics or values for the signals. Thereafter, responsive to a query, the system can determine the index in the matrix corresponding to the time/day, and then use those preferences and context to construct a query to apply to a multimedia content data structure to identify candidate multimedia content items to present.

FIG. 1 illustrates an example system 100 for data structure queries to manage loading time of multimedia content. The system 100 can include a data processing system 102. The data processing system 102 can communicate with one or more data provider devices 108, or one or more computing devices 104 via a network 105. The network 105 can include computer networks such as the Internet, local, wide, metro, or other area networks, intranets, satellite networks, and other communication networks such as voice or data mobile telephone networks. The network 105 can be used to access information resources such as electronic content items, media content, web pages, web sites, domain names, or uniform resource locators that can be presented, output, rendered, or displayed on at least one computing device 104, such as a laptop, desktop, tablet, personal digital assistant, smartphone, portable computers, speaker, smart television, set-top box, a digital media player, a microconsole, network appliance, or entertainment device. For example, via the network 105 a user of the computing device 104 can access information or data provided by a data provider 108. The computing device 104 may or may not include a display; for example, the computing device may include limited types of user interfaces, such as a display device 132, sensor 134 (e.g., a microphone), speaker 136, or remote controller device 134. In some cases, the primary user interface of the computing device 104 may be a microphone and speaker 136.

The network 105 can include or constitute a display network, e.g., a subset of information resources available on the internet that are associated with a content placement or search engine results system, or that are eligible to include third-party content items as part of a content item placement campaign. The network 105 can be used by the computing device 104 or data processing system 102 to access information resources such as web pages, web sites, domain names, or uniform resource locators that can be presented, output, rendered, or displayed by the client computing device 104. For example, via the network 105 a user of the client computing device 104 can access information or data provided by the data provider computing device 108.

The network 105 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 105 may include a wireless link, such as an infrared channel or satellite band. The topology of the network 105 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS"), or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such, as a computing device having a processor to communicate via the network 105, for example, with the computing device 104, or the data provider device 108. The data processing system 102 can include at least one computation resource, server, processor, or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm, or machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one data provider device 108. The data provider device 108 can include at least one logic device, such as a computing device having a processor to communicate via the network 105, for example, with the computing device 104, or the data processing system 102. The data provider device 108 can include at least one computation resource, server, processor or memory. For example, data provider device 108 can include a plurality of computation resources or servers located in at least one data center. The data provider device 108 can include one or more component or functionality of the data processing system 102.

The computing device 104 can include, interface, or otherwise communicate with at least one natural language processor ("NLP") component 112 and an interface 110. The computing device 104 can also include, interface, or otherwise communicate with at least one display device 132, sensor 134, speaker 136, or remote controller device 134. The computing device 104 can interface or communicate with these components via a wired or wireless communication technique.

Figure 4:
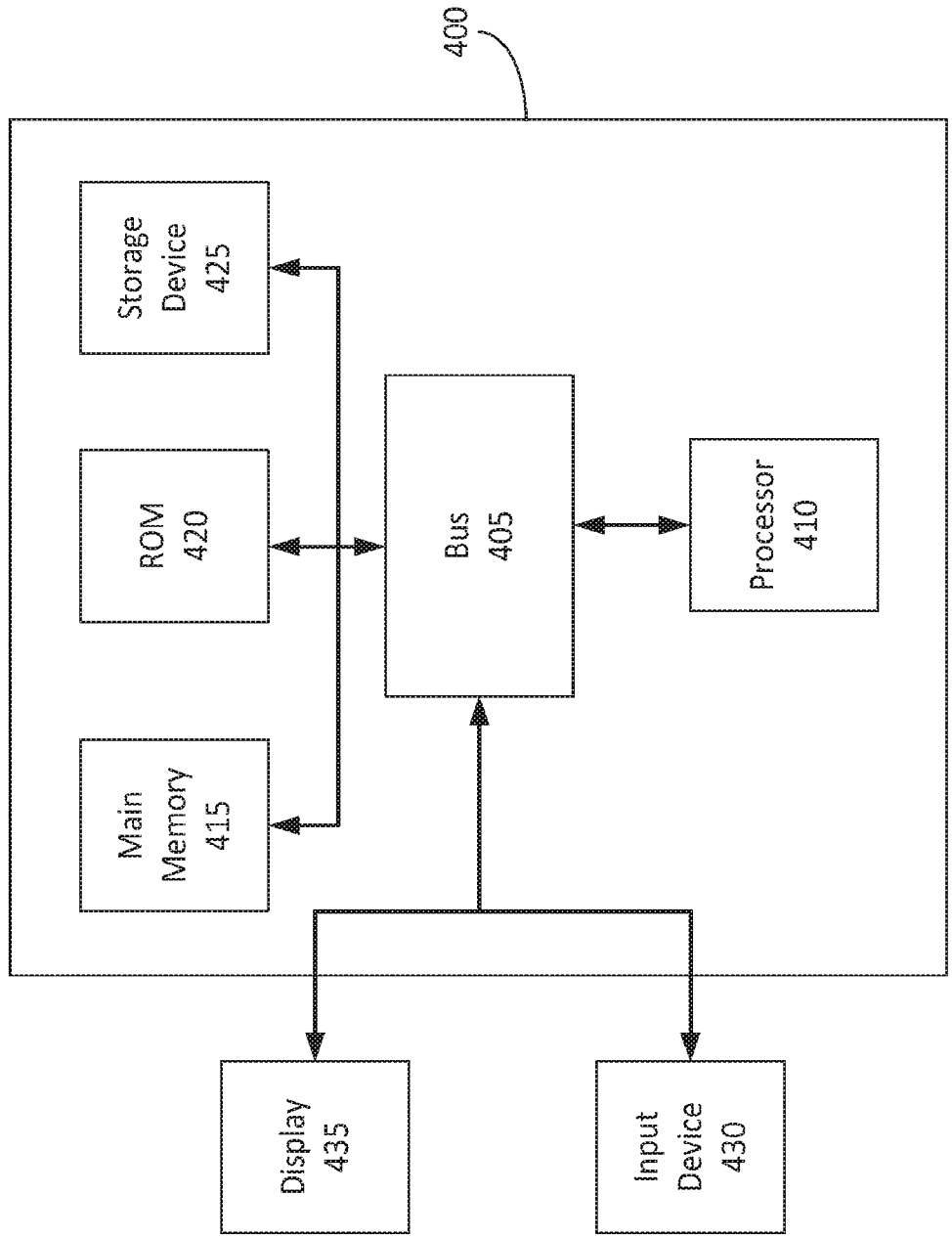
FIG. 4 is a block diagram illustrating a general architecture of a computer system that can be employed to implement elements of the systems and methods described and illustrated herein.

The display device 132 can include one or more components or functionalities of display 435 depicted in FIG. 4. The sensor 134 can include, for example, a microphone, an ambient light sensor, proximity sensor, temperature sensor, accelerometer, gyroscope, motion detector, GPS sensor, location sensor, or touch sensor. The speaker 136 can include a transducer, loudspeaker, or apparatus that converts electrical or magnetic impulses into sound. The computing device 104 can include an interface comprising an audio driver that provides a software interface to the hardware speaker 136. The audio driver of the interface can execute an audio file or audio stream or other instructions provided by a component of the computing device 104 or the data processing system 102 to control the speaker 136 to generate a corresponding acoustic wave or sound wave.

The interface 110 of the computing device 104 can be designed, configured, constructed, or operated to receive and transmit information using, for example, data packets. The interface 110 can receive and transmit information using one or more protocols, such as a network protocol. The interface 110 can include a hardware interface, software interface, wired interface, or wireless interface. The interface 110 can include or provide a graphical user interface or voice interaction interface. The interface 110 can render graphical output via display device 132. The interface 110 can facilitate translating or formatting data from one format to another format. For example, the interface 110 can include an application programming interface that includes definitions for communicating between various components, such as software components.

The remote controller device 134 can refer to a wireless controller device or other device that controls an aspect or function of the computing device 104 or otherwise communicates with the computing device 104 or data processing system 102. For example, the remote controller device 134 can include one or more circuits, a wireless module, transmitter, a power source, an input interface (e.g., input device 430 depicted in FIG. 4), and one or more sensors (e.g., sensor 134) to receive an input and provide an indication of the input to the computing device 104 or data processing system 102. The remote controller device 134 can receive input via buttons, switches, touch interface, or gestures. In some cases, the remote controller device 134 can be a stand-alone remote control that is operational to communicate or control the computing device 104. In some cases, the remote controller device 134 can refer to a software application executed on a type of computing device, where the software application is configured to communicate with the computing device 104 or data processing system 102. For example, the remote controller device 104 can include an application executed by a smartphone, tablet, smartwatch, or tablet.

The remote controller device 138 can be deactivated, inactive, turned off, in a sleep state, or in a standby state when the remote controller device 138 is not in use, disabled, or malfunctioning. When the remote controller device 138 is not in use, the computing device 104 can utilize a voice-interface where the computing device 104 receives voice commands from a user and processes the voice commands, at least in part, using an NLP component 112 executed by the computing device 104 or in conjunction with an NLP component 112 executed by data processing system 102.

The computing device 104 can include an NLP component 112 configured to detect a keyword and perform an action based on the keyword. The NLP component 112 can filter out one or more terms or modify the terms prior to transmitting the terms to the data processing system 102 for further processing. The NLP component 112 of or executed by the computing device 104 can be referred to as a local NLP component or client-side NLP component. The NLP component 112 of the computing device 102 can convert analog audio signals detected by the microphone into a digital audio signal and transmit one or more data packets carrying the digital audio signal to the data processing system 102 via the network 105. In some cases, the NLP component 112 can transmit data packets carrying some or all of the input audio signal responsive to detecting an instruction to perform such transmission. The instruction can include, for example, a trigger keyword, hotword, or other keyword or approval to transmit data packets comprising the input audio signal to the data processing system 102 for further processing by the NLP component 112 of the data processing system 102, which can be referred to as the server NLP component or cloud NLP component.

The client computing device 104 can be associated with an end user that enters voice queries as audio input into the client computing device 104 (e.g., via the sensor 134) and receives audio output in the form of a computer generated voice that can be provided from the data processing system 102 (or the data provider computing device) to the client computing device 104 and is output from the speaker 136. The computer generated voice can include recordings from a real person or computer generated language.

The interface 110 and NLP component 112 of the computing device 104 can each include at least one processing unit or other logic device, such as programmable logic array engine or module configured to communicate with the one or more components of the computing device 104 or data processing system 102. The interface 110 and NLP component 112 can be separate components, a single component, or part of the computing device 104. The system 100 and its components, such as a computing device 104, can include hardware elements, such as one or more processors, logic devices, or circuits.

The data processing system 102 can include or execute at least one interface 110. The interface 110 of the data processing system can be referred to as a server-side interface, data processing system interface, remote interface, or system interface. The interface 110 of the data processing system can include one or more component or functionality of interface 110 of the computing device 104. The data processing system 102 can include, interface, or otherwise communicate with at least one NLP component 112. The NLP component 112 of the data processing system can be referred to as the data processing system NLP component, the server NLP component or cloud NLP component. The NLP component 112 of the data processing system can include one or more component or functionality of the NLP component 112 of the computing device 104.

The data processing system 102 can include, interface, or otherwise communicate with at least one digital assistant component 114. The digital assistant component 114 can refer to a system or component of the data processing system 102 that includes or interfaces with one or more of the NLP component 112, interface 110, query generator component 116, content selector component 118 or, audio signal generator component 120 to facilitate parsing voice-based queries or requests and providing responses to in a voice-based environment. The data processing system 102 can include, interface, or otherwise communicate with at least one query generator component 116. The data processing system 102 can include, interface, or otherwise communicate with at least one content selector component 118. The data processing system 102 can include, interface, or otherwise communicate with at least one audio signal generator 120. The data processing system 102 can include, interface, or otherwise communicate with at least one data repository 122. The data repository 122 can include one or more local or distributed databases, and can include a database management system. The data repository 122 can include computer data storage or memory. The at least one data repository 122 can include or store, in one or more data structures or databases, including, for example, a matrices data structure 124, historical data data structure 126, and a multimedia content data structure 128. The multimedia content data structure 128 can store multimedia content items, electronic content items, or online documents. The matrices data structure 124 can store one or more multi-dimensional matrices having values of signals. The historical data data structure 126 can store historical signal information from a computing device 104 or aggregated signal information from multiple computing devices over a time interval.

In some cases, the content selector component 118 can select electronic content items from data repository 122 and provide the selected subset of electronic content items for presentation via interface 110 of the computing device 104.

The interface 110, NLP component 112, digital assistant component 114, query generator component 116, content selector component 118, or audio signal generator component 120, can each include at least one processing unit or other logic device such as programmable logic array engine, or module configured to communicate with the database repository or database 140. The interface 110, NLP component 112, digital assistant component 114, query generator component 116, content selector component 118, audio signal generator component 120 and data repository 122 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of computing devices 104. A user of a computing device 104 can affirmatively authorize the data processing system 102 to obtain network activity information corresponding to the user's computing device 104. For example, the data processing system 102 can prompt the user of the computing device 104 for consent to obtain one or more types of network activity information. The identity of the user of the computing device 104 can remain anonymous, and the computing device 104 can be associated with a unique identifier (e.g., a unique identifier for the user or the computing device provided by the data processing system or a user of the computing device). The data processing system can associate each observation with a corresponding unique identifier.

The data processing system 102 can include an assistant application, application, script, or program installed at the client computing device 104, such as an application to communicate input audio signals to the interface 110 of the computing device 104 and to drive components of the client computing device to render output audio signals. The data processing system 102 can receive data packets or other signal that includes or identifies an audio input signal. For example, the data processing system 102 can execute or run the NLP component 112 to receive or obtain the audio signal and parse the audio signal. For example, the NLP component 112 can facilitate interactions between a human and a computer. The NLP component 112 can be configured with techniques for understanding natural language and allowing the data processing system 102 to derive meaning from human or natural language input. The NLP component 112 can include or be configured with techniques based on machine learning, such as statistical machine learning. The NLP component 112 can utilize decision trees, statistical models, or probabilistic models to parse the input audio signal. The NLP component 112 can perform, for example, functions such as named entity recognition (e.g., given a stream of text, the component can determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), and semantic processing (e.g., processing that can occur after identifying a word and encoding its meaning in order to relate the identified word to other words with similar meanings).

The NLP component 112 converts the audio input signal into recognized text by comparing the input signal against a stored, representative set of audio waveforms (e.g., in the data repository 124) and choosing the closest matches. The set of audio waveforms can be stored in a data repository 122 or other database accessible to the data processing system 102. The representative waveforms are generated across a large set of users and then may be augmented with speech samples from the user. After the audio signal is converted into recognized text, the NLP component 112 matches the text to words that are associated, for example, via training across users or through manual specification, with actions that the data processing system 102 can serve.

The audio input signal can be detected by the sensor 134 of the client computing device 104. The client computing device 104 can provide the audio input signal to the data processing system 102 (e.g., via the network 105) where it can be received and provided to the NLP component 112 or stored in the data repository 122 for further processing. The client computing device 104 can provide only a portion of the audio input signal. For example, the client computing device 104 can execute the local NLP component 112 to detect a trigger word or hotword. A hotword can refer to a keyword or phrase that wakes up the computing device 104 or initiates a function of the computing device 104. The hotword can refer to a script or module of the NLP 112 of the computing device 104 that is configured to listen for specific keyword words chosen to activate a voice interface. Upon detection of the hotword, the system is readied for a voice-based search, questions, or commands. The computing device 104 can then transmit, to the data processing system 102, the audio input subsequent to the hotword. The client computing device 104 can terminate the audio transmission upon detecting a pause or session break in the audio input of a predetermined time interval (e.g., one second, two seconds, three seconds, four seconds, or five seconds).

The NLP component 112 can obtain the input audio signal. From the input audio signal, the NLP component 112 can identify at least one request or at least one trigger keyword corresponding to the request. The request can indicate intent or subject matter of the input audio signal. The trigger keyword can indicate a type of action likely to be taken. For example, the NLP component 112 can parse the input audio signal to identify at least one request to provide multimedia content for display via display device 132. The trigger keyword can include at least one word, phrase, root or partial word, or derivative indicating an action to be taken. For example, the trigger keyword "show" or "show me something to watch" from the input audio signal can indicate a need to perform a search. In this example, the input audio signal (or the identified request) does not directly express an intent for transport, however the trigger keyword indicates that transport is an ancillary action to at least one other action that is indicated by the request.

The NLP component 112 can parse the input audio signal to identify, determine, retrieve, or otherwise obtain the request. For instance, the NLP component 112 can apply a semantic processing technique to the input audio signal to identify the request. The NLP component 112 can apply the semantic processing technique to the input audio signal to identify a trigger phrase that includes one or more trigger keywords, such as a first trigger keyword and a second trigger keyword. For example, the input audio signal can include the sentence "show me something to watch." The NLP component 112 can apply a semantic processing technique or other natural language processing technique to the data packets comprising the sentence to identify trigger phrases and keywords thereof, such as "show" and "watch."

The data processing system 102 can include, execute or otherwise communicate with a query generator component 116 to construct or generate a query to be applied to a multimedia content data structure 128 to identify candidate content items responsive to the request from the computing device 104. To construct a query to obtain multimedia content responsive to the request, the query generator component 116 can access a matrices data structure 124 to retrieve values of signals. To obtain the values of signals, the query generator component 124 can perform a lookup in one or more matrices of the matrix data structure 124. The query generator component 116 can perform the lookup using an index value corresponding to a coordinate in the matrix. The index values can be determined based on attributes or characteristics associated with the request.

The data processing system 102 can identify a multi-dimensional matrix data structure from which to retrieve signals for constructing a query. The multi-dimensional matrix data structure can have an identifier corresponding to an identifier of the computing device 104, such as an account identifier. The multi-dimensional matrix data structure can correspond to a geographic region or location of the computing device. The multi-dimensional matrix data structure can correspond to one or more attributes or characteristics associated with the computing device 104. For example, a first multi-dimensional matrix data structure can correspond to a first device type, and a second multi-dimensional matrix data structure can correspond to a second device type.

The multi-dimensional matrix data structure can be populated or generated based on historical network activity information associated with one or more computing device 104. The matrix data structure can be a two-by-two matrix as illustrated in Table 1 below.

TABLE 1

Illustrative example of 2-by-2 multi-dimensional matrix data structure.

|  | Day | Night |
|---|---|---|
| Weekday |  |  |
| Weekend |  |  |

The matrix can be populated with values for the signal. The values can be numeric values, string, characters, or alphanumeric. The type of values can be based on the type of signal. The value of a signal can include a list of values. The data processing system 102 can store a different matrix for each signal, or the data processing system can create a three-dimensional matrix where a first dimension is quantized day, a second dimension is quantized time, and a third dimension is signals. Thus, a specific one or more value in the matrix can be identified by three coordinates as follows: (Weekday, Day, Signal_1).

The multi-dimensional matrix data structure can be populated or generated based on historical network activity information associated with each of the plurality of signals. The data processing system 102 can utilize one or more types of signals, such as preference signals and context signals. Preference signals can refer to signals that indicate a preference associated with the computing device 104 or user thereof, such as: 1) a preference for one or more applications to provide the multimedia content items (e.g., preferred provider of multimedia content or source of multimedia content); 2) a preference for a transaction type (e.g., free content, content for purchase, subscription service); 3) a preference for a media consumption mode (e.g., new multimedia content items not previously rendered by the computing device; continue series, re-watch multimedia content items; background mode). The data processing system 102 can utilize additional or fewer preference signals.

The data processing system 102 can determine the preferences or context for the computing device 104, or account associated with the computing device, based on historical network activity information. The data processing system 104 can utilize one or more statistical techniques or machine learning techniques to determine, model, predict or otherwise identify preference or context. For example, the data processing system 104 can use a mode function to identify the most common values for a signal over a predetermined time interval (e.g., 7 days, 30 days, 45 days, or 60 days). The data processing system can use an average function or moving average (e.g., a succession of averages derived from successive segments to identify values for signals), depending on the type of signal. The data processing system 104 can rank preferences or context values, and use a threshold to determine a number of highest ranking values to select as preferences or context to be includes in the matrix.

For example, the computing device 104 can execute the following five applications over the course of a predetermined time interval (e.g., 7 days, 30 days, 45 days, or 60 days) to render or play multimedia content items: app_1, app_2, app_3, app_4, and app_5. The data processing system 102 can determine that over the predetermined time interval, app1, app_2, and app_3 were executed with a higher frequency as compared to app_4 and app_5. The data processing system 102 can identify the top 3 highest ranking apps as app_1, app_2 and app_3 to use as values for a preference signal. In some cases, the data processing system 102 can determine the highest ranking apps on a per quantized day and time value (e.g., the top 3 apps executed most frequently on weekend nights). For example, if the data processing system 102 executes the same two applications on weekend nights for the last 4 weeks, the data processing system 102 can establish the first preference signal for weekend nights as a list of the two applications: app_2 and app_3.

Further, the data processing system 102 can establish the preference for a quantized day and a quantized time. The data processing system 102 can determine that on weekday nights, the computing device prefers to execute application_1 for playing multimedia content, whereas on the weekend the user prefers application_2 and application_3. Thus, the multi-dimensional matrix data structure for the first preference signal can be illustrated in Table 2.

TABLE 2

Illustrative example of 2-by-2 multi-dimensional matrix data structure for an application preference signal.

| Preference_Signal_1 | Day | Night |
|---|---|---|
| Weekday | App_1, App_2, Website_1 | App_1 |
| Weekend | App_2, App_3 | App_2, App_3 |

As illustrated in Table 2, the first preference signal can indicate a preference for an application to execute to play multimedia content. The signal can have different values for different quantized day and quantized time indices. The signal can have different values for different computing devices 104, as different computing devices may exhibit different preferences for applications to execute. In this example, if the data processing system 102 receives a request for content on Tuesday at 10:30 PM, the data processing system 102 can map the day and time stamps to a quantized day value of "weekday" and a quantized time value of "night". The data processing system 102 can access a matrix data structure populated with values corresponding to the computing device 104 from which the data processing system 102 receives the request. The data processing system 102 can use the quantized values "weekday" and "night" to perform a lookup in the matrix data structure to identify the value for the signal as "app_1". The data processing system 102 can then use this value to generate a query or filter a multimedia content data structure to identify candidate multimedia content items to present to the computing device 104 responsive to the request.

A second preference signal can include a preference for a transaction type. Transaction types can refer to a type of electronic transaction in which the computing device 104 engages in order to procure multimedia content. The data processing system 102 can determine values for the second preference signal based on historical network activity information. The data processing system 102 can determine the types of transactions in which the computing device 104 engaged over a predetermined time period to determine a preference. Types of transactions can include, for example, free multimedia content, purchased multimedia content, rented multimedia content, or subscription service. The data processing system 102 can further determine values for the preference signal based on quantized day and time values, as illustrated in the matrix in Table 3.

TABLE 3

Illustrative example of 2-by-2 multi-dimensional matrix data structure for a transaction type preference signal.

| Preference_Signal_2 | Day | Night |
|---|---|---|
| Weekday | Free | Rent |
| Weekend | Subscription | Purchase |

Thus, if the request corresponds to quantized day and time values of "weekday" and "night, the data processing system 102 can retrieve a value for the second preference signal as "rent", as illustrated in the Table 3 matrix for the second preference signal for the computing device 104.

A third preference signal can include a preference for a media consumption mode. The media consumption mode signal can refer to types of multimedia content the computing device 104 prefers to play. Media consumption modes can include new multimedia content items not previously rendered by the computing device (e.g., not previously rendered by the computing device); continuation (e.g., continuing with a multimedia content series); or re-watch (e.g., re-render a same multimedia content item). The data processing system 102 can determine values for the third preference signal for each quantized day and time value based on historical network activity information, and populate the values in a matrix data structure for the third preference signal, as illustrated in Table 4.

TABLE 4

Illustrative example of 2-by-2 multi-dimensional matrix data structure for a media consumption mode preference signal.

| Preference_Signal_3 | Day | Night |
|---|---|---|
| Weekday | re-watch | new |
| Weekend | continue series | continue series |

Thus, if the request corresponds to a weekday night, the data processing system 102 can retrieve the value "continue series" for the third preference signal for the computing device 104. The data processing system 102 can use this value to construct a query to identify multimedia content items to present to the computing device 104 as candidate multimedia content items responsive to the request.

The one or more preference signal matrix data structures can be combined into a single multi-dimensional matrix structure or stored as separate matrix structures. A single multi-dimensional matrix structure for the preferences signals can have the following dimensions 2×2×3. For example, the first dimension can be weekday and weeknight; the second dimension can be day and night; and the third dimension can be preference_signal_1, preference_signal_2, and preference_signal_3. Thus, to obtain all values for a quantized day and time, the data processing system 102 can perform a lookup as follows: retrieve values for all signals corresponding to weekday night. This can retrieve values for preference signals for quantized day and time weekday night as follows: app1, rent, new. The data processing system 102 can construct a query or filter using Boolean logic as follows: app_1 AND rent AND new.

In addition to preference signals, or instead of preference signals, the data processing system 102 can use values for context signals to generate the query. Context signals can include information about the circumstances that form the setting for the multimedia rendering event. Context signals can indicate the circumstances for the quantized day and time. The context signals can include: 1) a preference for a media consumption duration (e.g., 15 minutes; 30 minutes; 1 hour; or 90 minutes); and 2) a preference for a media type (e.g., movie, television show, live television, or previously recorded content). The data processing system 102 can utilize additional or fewer context signals. The data processing system 102 can determine the context signals using historical network activity information, or external sensor data.

A first context signal can include a preference for a media consumption duration. The duration can refer to an amount of time a user has to view a multimedia content item, or the amount of time the user prefers to watch multimedia content. The duration can be specific to a quantized day and time. The data processing system 102 can determine the duration based on historical network activity information over a predetermined time interval. For example, the data processing system 102 can determine that for the past 30 days, the computing device 104 renders multimedia content for 30 minutes on weekday nights, and approximately 2 hours on weekend nights. Thus, the data processing system 102 can set the value for the duration context signal to 30 minutes for weekday night, and 2 hours for weekend night, as illustrated in the matrix in Table 5.

TABLE 5

Illustrative example of 2-by-2 multi-dimensional matrix data structure for a consumption duration context signal.

| Context_Signal_1 | Day | Night |
|---|---|---|
| Weekday | 15 minutes | 30 minutes |
| Weekend | 60 minutes | 120 minutes |

As illustrated in the matrix for the first context signal in Table 5, the duration can be determined for each quantized day and time values. The data processing system 102 can determine the duration value as an average for the quantized day and time value over a predetermined time interval (e.g., 4 weeks, 8 weeks, or 12 weeks), a moving average, a mode, or other statistical determination.

The data processing system 102 can determine the duration using external sensor feedback. For example, the data processing system 102 can determine a start and stop time for playing multimedia content based on a time the computing device 104 is turned on and turned off; a time a lighting device connected to the data processing system 102 via network 105 is turned on or off; entries in a calendar data structure having an account identifier corresponding to an account identifier of the computing device 104; adjusting a thermostat device connected to the data processing system 102 via network 105; or home automation queries or other device activity with one or more devices associated with an account associated with the account of the computing device. For example, a time the lights in the room with the computing device 104 are turned on and off can be an indicator of the duration available to render multimedia content. The light can be controlled by a lighting controller or device that is configured to communicate with data processing system 104 via network 105, and provide an indication of the light status to the data processing system 104.

A second context signal can include a preference for a media type (e.g., movie, television show, live television, or previously recorded content). The data processing system 102 can determine the preference for the media type based on historical network activity, and store the preference values in a 2-by-2 matrix in accordance with quantized day and time values, as illustrated in Table 6.

TABLE 6

Illustrative example of 2-by-2 multi-dimensional matrix data structure for a consumption duration context signal.

| Context_Signal_2 | Day | Night |
| --- | --- | --- |
| Weekday | clips | recorded |
| Weekend | live television | movie |

As illustrated in table 6, the media type signal can have a value of "previously recorded content" for a request corresponding to a weekday night quantized value. The data processing system 102 can construct a query combining values for multiple context signals for the quantized day and time "weekday night" as follows: 30 minutes AND recorded, for example. Recorded can refer to multimedia content that was recorded on a digital video recorder device communicatively coupled to the computing device 104. Recorded can refer to content that has previously aired or recorded by another data provider, as opposed to live shows that are currently being played live. The user of the computing device 104 may have instructed the digital video recorder device to record the multimedia content.

The data processing system 104 can generate the two-by-two matrices for each of the plurality of signals based on aggregating historical data over a predetermined time interval. The aggregated information can refer to aggregated multiple data points for a single account or computing device 104. The data processing system 104 can also aggregate information across multiple computing devices 104 associated with a same account identifier. The data processing system 104 can aggregate information across multiple computing devices 104 having different account identifiers, but other characteristics in common.

The data processing system 102 can combine each of the two-by-two matrices for each of the plurality of signals to generate a three-dimensional matrix. The data processing system 102 can generate a first three-dimensional matrix for preference signals and a second three-dimensional matrix for context signals. The data processing system 102 can generate a single three-dimensional matrix combining both preference signals and context signals. The data processing system 102 can generate a different multi-dimensional matrix for each account identifier. The data processing system 102 can generate a four-dimensional matrix that combines all signals and account identifiers as follows: (account_id, quantized_day, quantized_time, signal).

Responsive to the request, the data processing system 102 can obtain a value for a signal based on an index value. Depending on the number of dimensions of the matrix, for example, the index values can correspond to a quantized day value and a quantized time value. Quantized day value can, for example, refer to a category of days. For example, rather than having a matrix with 7 rows, one for each day in the week, the matrix can have 2 rows, one for weekdays and one for weekend days. By quantizing the day values into 2 quantum, or categories, the size of the matrix can be greatly reduced from 7 rows to 2 rows, thereby reducing the amount of memory consumption of the matrix as well as increasing the lookup time.

The quantized time value can, for example, refer to a category of times in a day. For example, rather than having a matrix for every second, minute or hour in the day, the data processing system 102 can use a matrix with 2 quantum for time, such as day and night. By quantizing the time values into 2 categories, the size of the matrix can be greatly reduced from potentially 1440 columns (e.g., for each minute) or 24 columns (e.g., for each hour) to 2 columns.

To determine the row and column index values to use to identify the value in the matrix, the data processing system can receive a day stamp and a timestamp corresponding to the request. The day stamp and time stamp corresponding to the request can refer to when the acoustic signal was received by the computing device 104, when the request was made, when the computing device 104 transmits the request, when the data processing system 102 receives the request, or when the data processing system 102 processes the request. In some cases, the day and time stamp corresponding to the request can refer to a day or time at which the user intends to watch the requested show. For example, a request made on Friday morning may include "what should I watch Saturday night?" In this example, the data processing system 102 (e.g., via NLP component 112) can identify the keyword "tonight" and map the day and time indicators in the request to a quantized day and time value (e.g., weekend and night).

The day stamp and the time stamp can be more granular than the quantized day and time values of the matrix. The computing device 104 can quantize the values prior to providing the day and time stamps to the data processing system 104. The data processing system 102 can map the day stamp to the quantized day value comprising one of a weekday or a weekend. For example, if the current day is Monday, Tuesday, Wednesday, Thursday or Friday, the data processing system 102 can determine the quantized day value to be "weekday". If the current day is Saturday or Sunday, the data processing system can determine the quantized day value to be "weekend".

The data processing system 102 can map the timestamp to the quantized time value comprising one of day or night. The data processing system 102 can use a predetermined time boundary to determine whether a current time corresponds to day or night. For example, times in between 4:00 AM and 9:59 PM can map to "day", and times in between 10:00 PM and 3:59 AM can map to night. In another example, times in between 4:00 AM and 7:59 PM can map to day, and times in between 8:00 PM and 3:59 AM can map to night.

In some cases, day and night can by dynamically determined. For example, the quantize day value can be determined based on sunrise and sunset times for a particular location. The data processing system can determine a location for the computing device 104, and then determine a sunrise time and a sunset time for the location on the day corresponding to the request. If the time corresponds to between the sunrise time and the sunset time, then the data processing system 102 can set the quantized time value to "day"; otherwise, "night".

The data processing system 102 can retrieve, via a lookup in a multi-dimensional matrix data structure with the quantized day value and quantized time value, a plurality of signals for the quantized day value and the quantized time value. For example, and with reference to Tables 2-6, the values for preference and context signals for "weekday" and "night" can be: app_1, rent, new, 30 minutes, recorded. The data processing system 102 can use the values of these five signals to construct a query or filter to be applied to the multimedia content data structure. The data processing system 102 can generate a query with the plurality of signals retrieved from the multi-dimensional matrix structure with the quantized day value and the quantized time value. For example, the query can be: find multimedia content provided by applications=app_1, that are available for rent, that the computing device has not previously played new, that have a duration of 30 minutes, and were previously recorded (e.g., not live television).

The data processing system 102 can include, execute, or otherwise communicate with a content selector component 118 to receive the query generated by the query generator component 116 and select, based on the query, one or more multimedia content items or electronic content items via a real-time content selection process. The content selection process can refer to or include performing a lookup in a data repository 122 for multimedia content items that match the query, keywords or other terms provided by the query generator component 116, or querying a data provider device 108 for electronic content items corresponding to the query or keywords. The real-time content selection process can include a service in which content items provided by multiple data providers are parsed, processed, weighted, or matched in order to select one or more content items to provide to the computing device 104. The content selector component 118 can perform the content selection process in real-time. Performing the content selection process in real-time can refer to performing the content selection process responsive to the request for content received via the client computing device 104. The real-time content selection process can be performed (e.g., initiated or completed) within a time interval of receiving the request (e.g., 5 seconds, 10 seconds, 20 seconds, 30 seconds, 1 minute, 2 minutes, 3 minutes, 5 minutes, 10 minutes, or 20 minutes). The real-time content selection process can be performed during a communication session with the client computing device 104 or within a time interval after the communication session is terminated.

For example, the data processing system 102 can include a content selector component 118 designed, constructed, configured or operational to select multimedia content item objects. To select the multimedia content items for display in a voice-based environment in a manner that manages loading time and responsiveness, the query generator component 116 can construct a query using signals retrieved from a multi-dimensional matrix. The content selector component 118 can analyze, parse, or otherwise process subject matter of candidate content items to determine whether the subject matter of the candidate content items correspond to the query generated by the query generator component 116. The content selector component 118 may identify, analyze, or recognize voice, audio, terms, characters, text, symbols, or images of the candidate content items using an image processing technique, character recognition technique, natural language processing technique, or database lookup. The candidate content items may include metadata indicative of the subject matter of the candidate content items, in which case the content selector component 118 may process the metadata to determine whether the subject matter of the candidate content item corresponds to the input audio signal.

The content selector component 118 can apply the query to a multimedia content data structure 128 to identify, in response to the query, multimedia content items that match the plurality of signals. Responsive to the request, the data processing system 102 can select one or more electronic content items (e.g., content item objects) from data repository 122 or a database associated with the data provider 108 and provide the electronic content items for presentation via the computing device 104 via network 105. The data processing system 102 can provide, to the computing device 104, for presentation via a graphical user interface rendered by the computing device 104, an indication of the multimedia content items (e.g., icons, list, text, or other identifiers) that match the plurality of signals for the quantized day value and the quantized time value retrieved from the multi-dimensional matrix data structure. The computing device 104 can interact with the content item object.

The computing device 104 can receive an audio response to the content item. The computing device 104 can receive an indication to select a button, hyperlink, or other widget associated with the content item object that causes or allows the computing device 104 to perform a function associated with the electronic content item object.

The data processing system 102 can include, execute, or communicate with an audio signal generator component 122 to generate an output signal. The output signal can include one or more portions. The output signal can correspond to the multimedia content item selected by the content selector component 118 during the real-time content selection process.

Figure 2:
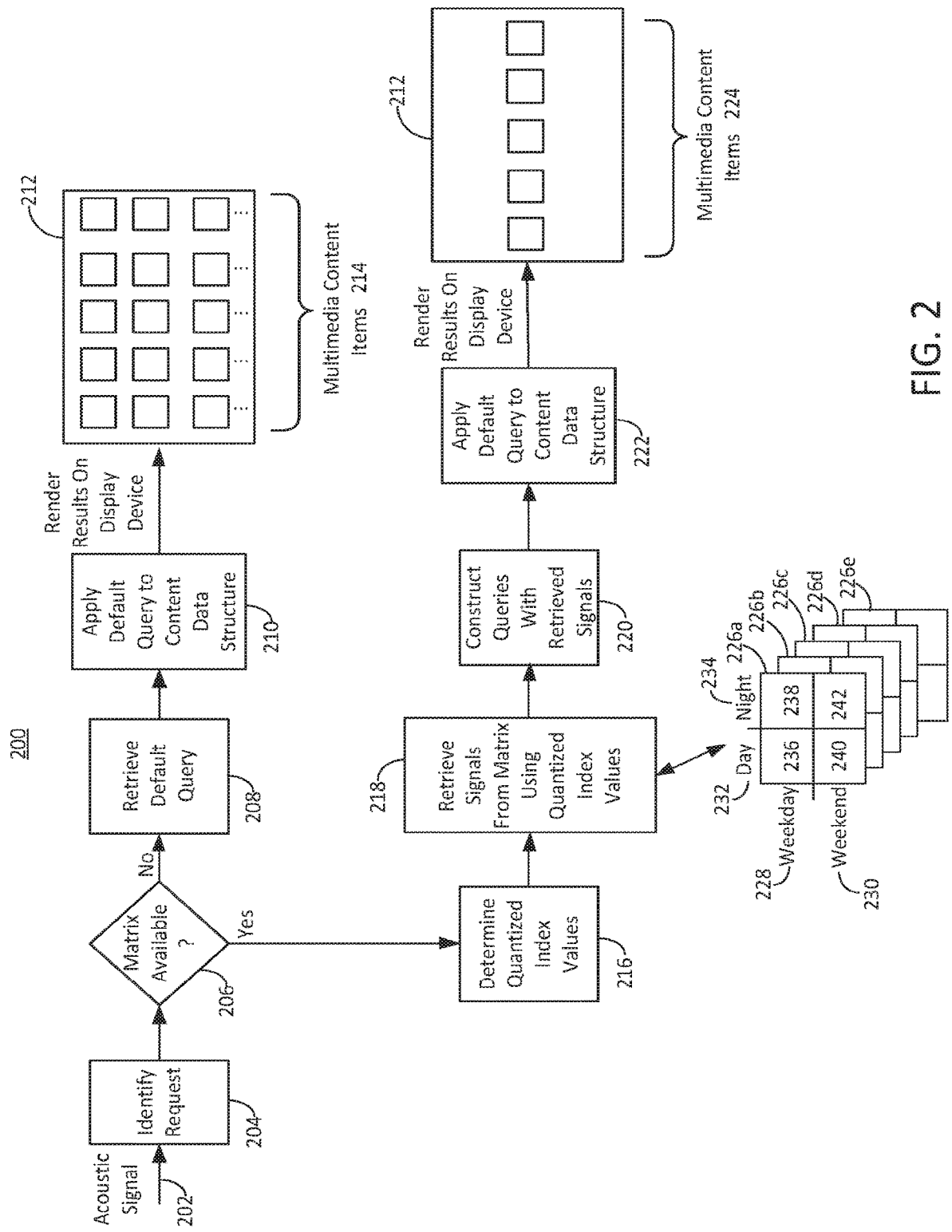
FIG. 2 is an illustration of an operation of a system for data structure queries to manage loading time of multimedia content.

FIG. 2 is an illustration of an operation of a system to transfer data from memory to manage graphical output latency. The operation 200 can be performed by one or more system or component depicted in FIG. 1 and FIG. 4, including, for example, a data processing system 102, interface 110, NLP component 112, digital assistant component 114, query generator component 116, content selector component 118, or computing device 104. At ACT 202, the data processing system or computing device can receive an acoustic signal based on voice or speech from a user of the computing device. At ACT 204, the data processing system or computing can identify a request. If the computing device identifies the request, the computing device can provide or transmit the request to the data processing system for further processing.

At ACT 206, the data processing system can determine whether a matrix is available. The matrix can refer to a matrix having values for signals from which the data processing system is configured to generate a query. The data processing system can determine whether a matrix data structure is available for an account identifier corresponding to the computing device. In some cases, a matrix data structure may not be available for a computing device because the data processing system may not have sufficient historical information to populate the matrix, or because the computing device disabled the matrix data structure or did not opt-in to the matrix data structure. Thus, if the matrix data structure is not available for the computing device, the data processing system can proceed to ACT 208.

At ACT 208, the data processing system can retrieve a default query that is not constructed using values from a matrix data structure. The default query can be "show all multimedia content items", or some other query. At ACT 210, the data processing system can apply the default query to a content data structure, such as the multimedia content data structure, and then render the results on a display device via an example graphical user interface as illustrated in block 212. Due to the matrix not being available to construct a query with signals for quantized day and time values, the data processing system may identify numerous multimedia content items that match the default query (e.g., 25, 50, 75, 100 or more). Navigating through the numerous multimedia content items can be challenging due to a limited voice-interface. Further, rendering numerous multimedia content items via graphical output may consume excessive computational resources (e.g., memory or processor utilization), or network bandwidth.

At ACT 206, if the data processing system determines that a matrix is available for the computing device, the data processing system can proceed to ACT 216. At ACT 216, the data processing system can determine quantized index values corresponding to the request, such as a quantized day value and quantized time value for the request. At ACT 218, the data processing system can use the quantized day value and quantized time value to retrieve values for signals from the matrix. The data processing system can select a multi-dimensional matrix corresponding to the computing device, and then identify values of signals for the quantized day value and time value.

The data processing system can access one or more matrices at ACT 218. The data processing system can access a separate two-dimensional matrix for each signal, or one or more three-dimensional matrices that combines multiple signals. For example, the data processing system can access multiple 2-by-2 matrices 226a-e, where matrices 226a-e correspond to Tables 2-6, respectively. In another example, the data processing system can access a single three-dimensional matrix where the dimensions are: quantized day, quantized time, and signals. The first dimension can be weekday 228 and weekend 230; the second dimension can be day 232 and night 234; and the third dimension can have signals 226a, 226b, 226c, 226d and 226e (e.g., signals corresponding to the first preference signal, the second preference signal, the third preference signal, the first context signal, and the second context signal as illustrated in Tables 2-6).

The values 236, 238, 240 and 242 can be stored in the matrix and retrieved by the data processing system using the quantized day and time values. For example, for weekday night, the data processing system can retrieve value 238, which can correspond to signal 226a.

At ACT 220, the data processing system can construct or generate a query using the values retrieved for each signal for each quantized day value and quantized time value. At ACT 222, the data processing system can apply the generated query to the content data structure. The data processing system can apply the query or use the query as a filter. The data processing system can then render the results on a display device connected to the computing device using a graphical user interface 212. The graphical user interface can render candidate multimedia content items 224. The number of multimedia content items results rendered using the matrix to generate the query as compared to the using the default query can be different. For example, the number of multimedia content items 224 can be fewer than the number of multimedia content items 214. Using the matrix to construct the query can result in fewer results that may be more relevant given the determined preference and context signals. Rendering fewer results using the matrix data structure and quantized values to construct the query can reduce resource utilization (e.g., memory or processor utilization), and network bandwidth usage.

Figure 3:
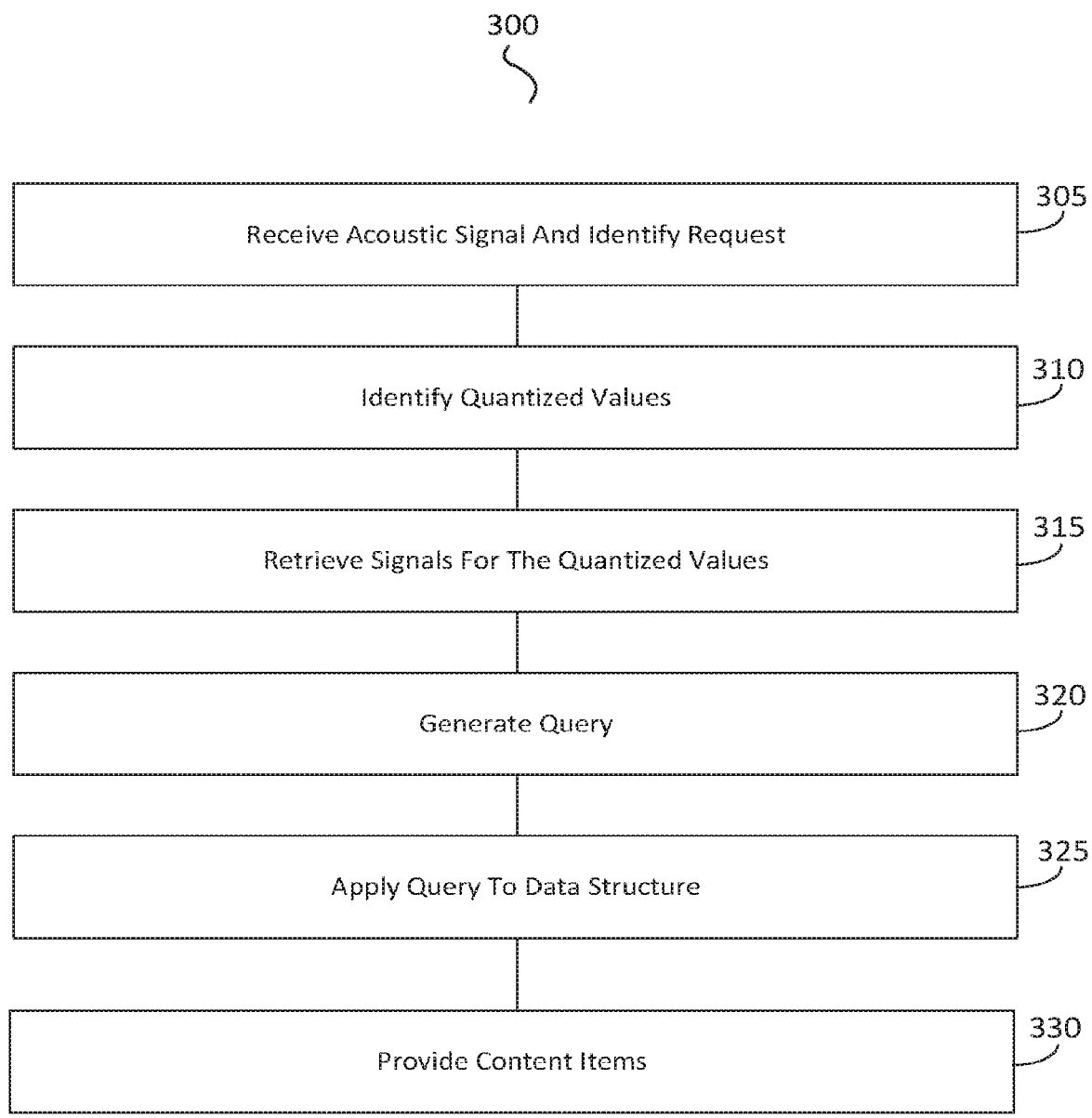
FIG. 3 is an illustration of a method querying a data structure to manage loading time of multimedia content.

FIG. 3 is an illustration of a method of transferring data from memory to manage graphical output latency. The method 300 can be performed by one or more system or component depicted in FIG. 1 and FIG. 4, including, for example, a data processing system 102, interface 110, NLP component 112, digital assistant component 114, query generator component 116, content selector component 118, or computing device 104. At ACT 305, the data processing system or computing device can receive an acoustic signal and identify a request. The computing device can sense or detect the acoustic signal using a microphone. The computing device can identify trigger word or a hotword in the acoustic signal. The computing device or a data processing system remote from the computing device can identify a request in the acoustic signal. In some cases, the computing device can receive the acoustic signal, determine that the acoustic signal is to be forwarded to a data processing system, and then forward the acoustic signal, or portion thereof, to the data processing system.

The data processing system can receive, via an interface of the data processing system comprising a digital assistant executed by one or more processors, data packets comprising an input audio signal (e.g., the acoustic signal) detected by a sensor of a computing device. The acoustic signal can include multiple portions. For example, a first portion of the acoustic signal can include a wake-up term, activation term, trigger word, or hotword that signals to the computing device that the user is requesting an action, function, or information. The computing device can use a local NLP component to identify the activation term. The computing device can receive a second portion of the acoustic signal subsequent to identifying the activation term. This second portion of the acoustic signal can be forwarded to a data processing system for further processing. The data processing system can identify the request in the second portion of the acoustic signal received by the data processing system. The computing device can parse or process the acoustic signal to identify the request.

At ACT 310, the data processing system can identify a quantized day value and a quantized time value corresponding to the request. The data processing system can identify a time stamp associated with the request to determine the quantized values. The data processing system can identify a time the request was received or transmitted, and map the identified time to quantized day and time values. The data processing system can parse the request to identify a time at which multimedia content is to be rendered, which can be different from the time at which the request was generated, transmitted or received. If the data processing system identifies a time or day in the request that is different from a time or day the request was generated, transmitted or received, the data processing system can select the time in the request for mapping. For example, the time in the request may indicate a time at which multimedia content is to be played.

The data processing system can override the time the request was received or transmitted with the time indicated by the user in the request.

The data processing system can map the identified day and time to quantized day and time values. By mapping the day and time to quantized day and time values, the data processing system can reduce memory footprint for each matrix data structure, and increase the matrix lookup speed.

At ACT 315, the data processing system can retrieve signals for the quantized day and time values. The data processing system can retrieve, via a lookup in a multi-dimensional matrix data structure with the quantized day value and quantized time value, values for signals for the quantized day value and the quantized time value. The matrix can include at least two dimensions, where a first dimension of the multi-dimensional matrix data structure has quantized days and a second dimension of the multi-dimensional matrix data structure has quantized times. The data processing system can store a separate matrix for each signal, or combine two or more signals into a three-dimensional matrix where the third dimension corresponds to the different signals.

At ACT 320, the data processing system can generate a query using the values of the signals retrieved from the multi-dimensional matrix. The data processing system can generate the query using Boolean logic, query fields, or filter. The query can include additional functions for each field, such as sum, average, minimum, or maximum.

At ACT 325, the data processing system can apply the query to a multimedia content data structure. The data processing system can apply the query to the multimedia content data structure to identify multimedia content items that match the value of the signals. Apply the query can include performing a lookup with the values, applying a filter to the data structure, executing a script, or other technique of retrieving or selecting data corresponding to the values of the signals retrieved from the matrices.

At ACT 330, the data processing system can provide the results from applying the query to the multimedia data structure to the computing device for presentation. The computing device can present the results via a display device connected to the computing device. The computing device can present the results using audio output. The computing device can receive an indication to execute or play a presented result.

FIG. 4 is a block diagram of an example computing system 400. The computer system or computing device 400 can include or be used to implement the system 100 or its components such as the computing device 104 or data processing system 102. The computing device 104 or data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus 405 for processing information. The computing system 400 also includes main memory 415, such as a random access memory (RAM) or other dynamic storage device, coupled to the bus 405 for storing information, and instructions to be executed by the processor 410. The main memory 415 can be or include the data repository 122 or data repository 118. The main memory 415 can also be used for storing position information, temporary variables, or other intermediate information during execution of instructions by the processor 410. The computing system 400 may further include a read-only memory (ROM) 420 or other static storage device coupled to the bus 405 for storing static information and instructions for the processor 410. A storage device 425, such as a solid state device, magnetic disk, or optical disk, can be coupled to the bus 405 to persistently store information and instructions. The storage device 425 can include or be part of the data repository 122 or data repository 118.

The computing system 400 may be coupled via the bus 405 to a display 435, such as a liquid crystal display or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the computing device 104, data processing system 102, or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. The systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users or may make use of personal information, the users may be provided with an opportunity to control whether programs or features may collect personal information (e.g., information about a user's social network, social actions or activities, a user's preferences, or a user's location) or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be included in a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be included in one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system," "computing device," "component," and "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures. For example, audio signal generator component 120, content selector component 118, NLP component 112, and other data processing system 102 components can include or share one or more data processing apparatuses, systems, computing devices, or processors. For example, interface 110, NLP component 112, mode detector component 114, fetching component 116, and other computing device 104 components can include or share one or more data processing apparatuses, systems, computing devices, or processors.

A computer program (also known as a program, software, software application, app, script, or code) can be written in any form of programming language, including compiled or interpreted languages and declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by or incorporated in special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., data packets representing a content item) to a client device (e.g., for purposes of displaying data to and receiving user input from a user interacting with the client device). Data generated at the client device (e.g., a result of the user interaction) can be received from the client device at the server (e.g., received by the data processing system 102 from the computing device 104 or the data provider device 108).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 112 or the content selector component 118, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements, and features discussed in connection with one implementation are not intended to be excluded from a similar role in other implementations or implementations.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation," or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only "A," only "B," as well as both "A" and "B." Such references used in conjunction with "comprising" or other open terminology can include additional items.

Where technical features in the drawings, detailed description, or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for providing multimedia content, the system comprising:
    memory storing instructions; and
    one or more processors, executing the instructions stored in the memory, to:
        generate, in response to receiving a request from a computing device, a query for multimedia content, wherein in generating the query for multimedia content one or more of the processors are to:
            determine, responsive to the request, a quantized day value and a quantized time value corresponding to the request,
            access a matrix data structure storing a plurality of preference values, wherein the plurality of preference values are stored in the matrix data structure in accordance with a plurality of preference signals, the matrix data structure having a first dimension of a plurality of quantized days and a second dimension of a plurality of quantized times, wherein the quantized day value is one of the plurality of quantized days, and wherein the quantized time value is one of the plurality of quantized times,
            retrieve, from the matrix data structure and based on the quantized day value and the quantized time value corresponding to the request, multiple preference values of the plurality of preference values stored in the matrix data structure, wherein the multiple retrieved preference values correspond, in the matrix data structure, to the quantized day value and the quantized time value corresponding to the request, and wherein the multiple retrieved preference values correspond to the multiple preference signals, respectively, and
            generate, based on the multiple retrieved preference values, the query for multimedia content;
        identify, in response to the request and based on the generated query for multimedia content, one or more multimedia content items that match the multiple retrieved preference values, from a multimedia content data structure storing a plurality of multimedia content items; and
        cause output, that corresponds to the identified one or more multimedia content items, to be rendered via the computing device in response to the request.

2. The system of claim 1, wherein in determining the quantized day value and the quantized time value corresponding to the request, one or more of the processors are to:
    determine a day stamp and a time stamp corresponding to the request,
    determine the quantized day value based on the day stamp corresponding to the request, and
    determine the quantized time value based on the time stamp corresponding to the request.

3. The system of claim 2, wherein in determining the day stamp and the time stamp corresponding to the request, one or more of the processors are to:
    when the request includes one or more temporal terms indicating a time for playing the multimedia content:
        determine the day stamp and the time stamp based on the one or more temporal terms, and when the request includes no temporal term:
   determine the day stamp and the time stamp based on a time that the request is received or transmitted.

4. The system of claim 2, wherein in determining the quantized time value based on the time stamp corresponding to the request, one or more of the processors are to:
   determine a location for the computing device;
   determine, for the location, a sunrise time and a sunset time; and
   determine the quantized time value based on whether the time stamp corresponding to the request is within a time period from the sunrise time to the sunset time.

5. The system of claim 1, wherein:
   the plurality of quantized days include weekday as a first quantized day and weekend as a second quantized day, and
   the plurality of quantized times include day as a first quantized time and night as a second quantized time.

6. The system of claim 1, wherein the matrix data structure is generated based on historical network activity information associated with the computing device and/or other computing devices.

7. The system of claim 1, wherein the plurality of preference values stored in the matrix data structure indicate:
   a preference for an application via which the one or more multimedia content items are provided;
   a preference for a transaction type;
   a preference for a media consumption mode;
   a preference for a media consumption duration; and/or
   a preference for a media type.

8. The system of claim 1, wherein the plurality of preference values stored in the matrix data structure are for preference signals of different types.

9. The system of claim 1, wherein the plurality of preference signals includes a first preference signal, and the multiple retrieved preference values include more than one preference value retrieved for the first preference signal.

10. A method implemented by one or more processors, the method comprising:
   generating, in response to receiving a request from a computing device, a query for multimedia content, wherein generating the query for multimedia content comprises:
      determining, responsive to the request, a quantized day value and a quantized time value corresponding to the request,
      accessing a matrix data structure storing a plurality of preference values, wherein the plurality of preference values are stored in the matrix data structure in accordance with a plurality of preference signals, the matrix data structure having a first dimension of a plurality of quantized days and a second dimension of a plurality of quantized times, wherein the quantized day value is one of the plurality of quantized days, and wherein the quantized time value is one of the plurality of quantized times,
      retrieving, from the matrix data structure and based on the quantized day value and the quantized time value corresponding to the request, multiple preference values of the plurality of preference values stored in the matrix data structure, wherein the multiple retrieved preference values corresponds, in the matrix data structure, to the quantized day value and the quantized time value corresponding to the request, and wherein the multiple retrieved preference values correspond to the multiple preference signals, respectively, and
      generating, based on the multiple retrieved preference values, the query for multimedia content;
   identifying, in response to the request and based on the generated query for multimedia content, one or more multimedia content items that match the multiple retrieved preference values, from a multimedia content data structure storing a plurality of multimedia content items; and
   causing, in response to the request, an indication of the one or more multimedia content items to be rendered via a graphical user interface of the computing device.

11. The method of claim 10, wherein determining the quantized day value and the quantized time value corresponding to the request comprises:
   determining a day stamp and a time stamp corresponding to the request,
   determining the quantized day value based on the day stamp corresponding to the request, and
   determining the quantized time value based on the time stamp corresponding to the request.

12. The method of claim 11, wherein determining the day stamp and the time stamp corresponding to the request comprises:
   when the request includes one or more temporal terms indicating a time for playing the multimedia content:
      determining the day stamp and the time stamp based on the one or more temporal terms, and
   when the request includes no temporal term:
      determining the day stamp and the time stamp based on a time that the request is received or transmitted.

13. The method of claim 11, wherein determining the quantized time value based on the time stamp corresponding to the request comprises:
   determining a location for the computing device;
   determining, for the location, a sunrise time and a sunset time; and
   determining the quantized time value based on whether the time stamp corresponding to the request is within a time period from the sunrise time to the sunset time.

14. The method of claim 10, wherein:
   the plurality of quantized days include weekday as a first quantized day and weekend as a second quantized day, and
   the plurality of quantized times include day as a first quantized time and night as a second quantized time.

15. The method of claim 10, wherein the matrix data structure is generated based on historical network activity information associated with the computing device.

16. The method of claim 15, wherein the plurality of preference values stored in the matrix data structure indicate:
   a preference for an application via which the one or more multimedia content items are provided;
   a preference for a transaction type;
   a preference for a media consumption mode;
   a preference for a media consumption duration; and/or a preference for a media type.

17. The method of claim 10, wherein the plurality of preference signals includes a first preference signal, and the multiple retrieved preference values include more than one preference value retrieved for the first preference signal.

18. A method implemented by one or more processors, the method comprising:
   determining that a received input, detected by a sensor of a computing device, includes a request;
   in response to determining that the received input includes the request:

identifying a day stamp and a timestamp corresponding to the request;

mapping the day stamp to a quantized day value that is one of a weekday or a weekend;

determining a location for the computing device;

determining a sunset time for the location;

mapping, based on the sunset time, the timestamp to a quantized time value that is one of day or night;

retrieving, via a lookup in a multi-dimensional matrix data structure with the quantized day value and quantized time value, multiple preference values corresponding to the quantized day value and the quantized time value, wherein the multiple preference values respectively correspond to multiple preference signals associated with the multi-dimensional matrix data structure, a first dimension of the multi-dimensional matrix data structure having quantized days and a second dimension of the multi-dimensional matrix data structure having quantized times;

generating a query with the multiple preference values retrieved from the multi-dimensional matrix structure with the quantized day value and the quantized time value;

applying the query to a multimedia content data structure to identify, in response to the query, a plurality of multimedia content items that match the multiple preference values; and providing, for presentation via a graphical user interface rendered by the computing device, an indication of the plurality of multimedia content items that match the multiple preference values for the quantized day value and the quantized time value retrieved from the multi-dimensional matrix data structure.

19. The method of claim 18, wherein the multiple preference signals comprise at least one of:

a preference for one or more applications to provide the multimedia content items;

a preference for a transaction type;

a preference for a media consumption mode;

a preference for a media consumption duration; and a preference for a media type.

20. The method of claim 18, wherein the plurality of preference signals include a first preference signal, and the multiple retrieved preference values include more than one preference value retrieved for the first preference signal.

* * * * *